United States Patent
Lee et al.

(10) Patent No.: US 8,274,851 B2
(45) Date of Patent: *Sep. 25, 2012

(54) MEMORY CONTROLLER FOR INTERFACING DATA, A PCB IN A COMPUTER SYSTEM INCLUDING THE MEMORY CONTROLLER, AND MEMORY ADJUSTING METHOD THEREOF

(75) Inventors: Man-Hee Lee, Hwaseong-si (KR); Cheol-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,663

(22) Filed: Jun. 1, 2011

(65) Prior Publication Data
US 2011/0231620 A1 Sep. 22, 2011

Related U.S. Application Data

(63) Continuation of application No. 12/352,756, filed on Jan. 13, 2009, now Pat. No. 7,978,546.

(30) Foreign Application Priority Data

Jul. 4, 2008 (KR) ................ 10-2008-0065096

(51) Int. Cl.
*G11C 7/00* (2006.01)
(52) U.S. Cl. .................................. 365/193; 365/189.07
(58) Field of Classification Search ............ 365/189.07, 365/193
See application file for complete search history.

(56) References Cited

U.S. PATENT DOCUMENTS 7,978,546 B2 * 7/2011 Lee et al. ...................... 365/193

* cited by examiner

*Primary Examiner* — Hoai V Ho
(74) *Attorney, Agent, or Firm* — Jefferson IP Law, LLP (57) ABSTRACT

A memory controller, a PCB and a computer system employing the memory controller, and a memory adjusting method using the memory controller. The memory controller interfaces data reading from and writing to a memory and includes: a characteristic estimating part estimating a characteristic of a memory output signal outputted from the memory for the data reading and writing; and a characteristic adjusting part controlling the memory so that the characteristic of the memory output signal is within a predetermined reference range if the characteristic of the memory output signal estimated by the characteristic estimating part is beyond the predetermined reference range.

8 Claims, 7 Drawing Sheets

FIG. 7

MEMORY CONTROLLER FOR INTERFACING DATA, A PCB IN A COMPUTER SYSTEM INCLUDING THE MEMORY CONTROLLER, AND MEMORY ADJUSTING METHOD THEREOF

CROSS-REFERENCE TO RELATED APPLICATION

This application is a continuation application of U.S. patent Ser. No. 12/352,756, filed on Jan. 13, 2009, which claims the benefit under 35 U.S.C. §119(a) of Korean Patent Application No. 10-2008-0065096, filed on Jul. 4, 2008 in the Korean Intellectual Property Office, the disclosure of which is incorporated herein by reference.

BACKGROUND OF THE INVENTION

1. Field of the Invention

Aspects of the present invention relate to a memory controller, a PCB (printed circuit board), a computer system and a memory adjusting method, and more particularly, to a memory controller which interfaces data reading and writing with respect to a memory, a PCB and a computer system employing the memory controller, and a memory adjusting method using the memory controller.

2. Description of the Related Art

In general, a computer system such as a desktop or a laptop includes a memory to which data is readable and writable, and a memory controller for interfacing data reading from and writing to the memory.

The memory controller receives a memory output signal outputted from the memory and estimates data values to be transmitted through the memory output signal based on the level of the received memory output signal.

The level of the memory output signal is generally regulated by a memory specification, but since the level of the memory output signal depends on capabilities of the memory, the level of the memory output signal is not always the same as an expected value. If the level of the memory output signal is beyond the expected value, the memory output signal cannot be correctly estimated, thereby lowering reliability in operation of the computer system.

SUMMARY OF THE INVENTION

Accordingly, aspects of the present invention provide a memory controller, a PCB, a computer system and a memory adjusting method which can improve a characteristic of a memory output signal outputted from a memory and enhance reliability of the computer system operation.

Additional aspects of the present invention will be set forth in part in the description which follows and, in part, will be obvious from the description, or may be learned by practice of the present invention.

The foregoing and/or other aspects of the present invention can be achieved by providing a memory controller interfacing data reading from and writing to a memory, including: a characteristic estimating part estimating a characteristic of a memory output signal outputted from the memory for the data reading and writing; and a characteristic adjusting part controlling the memory so that the characteristic of the memory output signal is within a predetermined reference range if the characteristic of the memory output signal estimated by the characteristic estimating part is beyond the predetermined reference range.

The characteristic estimating part may include: a reference signal generating part generating a reference signal corresponding to the predetermined reference range; and a comparing part comparing the memory output signal outputted from the memory with the reference signal.

The characteristic adjusting part may set a mode register of the memory storing data for controlling an operation mode of the memory.

The characteristic adjusting part may further include a calibration resistor connected to the memory to calibrate the impedance of the memory.

The characteristic adjusting part may vary resistance of a variable adjusting resistor to adjust impedance of the memory.

The memory controller may further include a variable adjusting resistor selectively connected in parallel to the calibration resistor of the memory.

The memory output signal estimated by the characteristic estimating part may include a data strobe.

The characteristic of the memory output signal may include at least one of either a level and slew rate of the memory output signal.

The foregoing and/or other aspects of the present invention can be also achieved by providing a computer system, including: a processor processing data; a memory to which the data processed by the processor is readable and writable; and a memory controller for interfacing data reading and writing between the processor and the memory, estimating a characteristic of a memory output signal outputted from the memory for the data reading and writing, and controlling, if the characteristic of the memory output signal is beyond a predetermined reference range, the memory so that the characteristic of the memory output signal is within the predetermined reference range.

The memory controller may generate a reference signal, corresponding to the predetermined reference range, and compares the memory output signal outputted from the memory with the reference signal.

The memory controller may set a mode register of the memory storing data for controlling an operation mode of the memory.

The memory controller may vary resistance of a variable adjusting resistor connected to the memory for adjusting impedance of the memory.

The memory output signal estimated by the memory controller may include a data strobe.

The characteristic of the memory output signal may include at least one of a level and a slew rate of the memory output signal.

The foregoing and/or other aspects of the present invention can be also achieved by providing a memory adjusting method including: estimating a characteristic of a memory output signal outputted from a memory for data reading and writing; and controlling, if the characteristic of the memory output signal is beyond a predetermined reference range, the memory so that the characteristic of the memory output signal is within the predetermined reference range.

The estimating may include: generating a reference signal corresponding to the predetermined reference range; and comparing the memory output signal outputted from the memory with the reference signal.

The controlling may include setting a mode register of the memory storing data for controlling an operation mode of the memory.

The controlling may include varying resistance of a variable adjusting resistor connected to the memory for adjusting impedance of the memory.

The estimated memory output signal may include a data strobe.

The characteristic of the memory output signal may include at least one of level and slew rate of the memory output signal.

The foregoing and/or other aspects of the present invention can be also achieved by providing a PCB (printed circuit board) for use in a computer system, comprising: a slot in which a memory, to which data processed by a processor is readable and writable, is to be installed; and a memory controller interfacing data reading and writing between the processor and the memory, estimating a characteristic of a memory output signal outputted from the memory for the data reading and writing, and controlling, if the characteristic of the memory output signal is beyond a predetermined reference range, the memory so that the characteristic of the memory output signal is within the predetermined reference range.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described in order to explain the present invention by referring to the figures.

Figure 1:
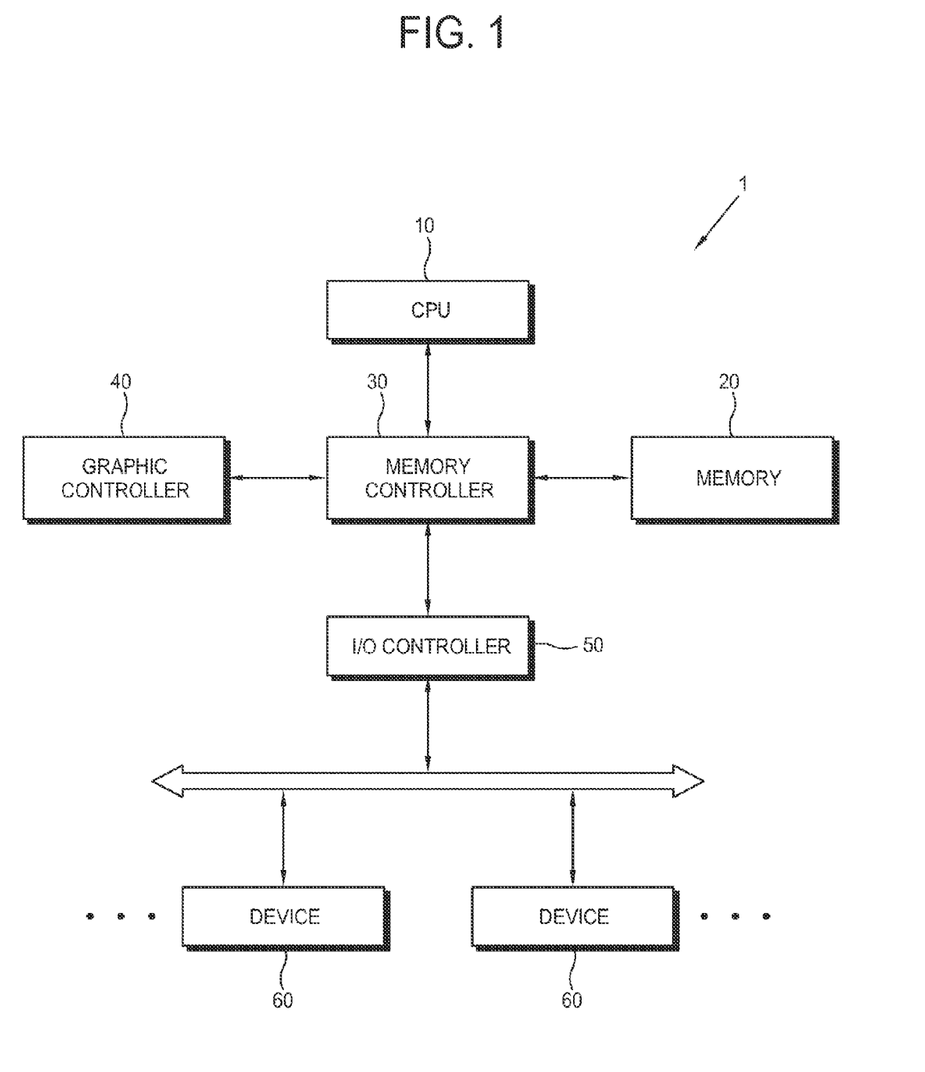
FIG. 1 illustrates a computer system according to an embodiment of the present invention.

FIG. 1 illustrates a computer system 1 according to an embodiment of the present invention. The computer system 1 may be realized as a desktop, a laptop, a mobile device, a portable audio or video playback device, a gaming device, a portable gaming device, a portable communications device, etc.

As shown in FIG. 1, the computer system 1 includes a CPU 10, a memory 20, a memory controller 30, a graphic controller 40, an I/O controller 50 and a device 60.

The CPU 10 controls the entire operation of the computer system 1, and executes a code loaded in the memory 20 and performs a command corresponding to the code. When performing the command, the CPU 10 may communicate with the memory controller 30, the graphic controller 40, the I/O controller 50 and the device 60, and may control the same components.

The memory 20 stores data upon operation of the CPU 10, the data including the code to be executed by the CPU 10. The memory 20 may be provided as a volatile memory, for example, a DDR SDRAM (double-data-rate synchronous dynamic random access memory), and includes DDR2 and DDR3 types.

The graphic controller 40 processes graphic data. The memory controller 30 interfaces data reading and writing between the memory 20 and the other components including the CPU 10. The I/O controller 50 interfaces communication between the CPU 10 and the device 60. The memory controller 30 and the I/O controller 50 may be integrated into a single chip or may be provided as separate chips. Further, the memory controller 30 and the CPU 10 may be integrated into a single chip.

The device 60 may include a variety of hardware, for example, a keyboard, mouse, tablet, touch screen, joystick, webcam, image scanner, barcode reader, sound card, speaker, microphone, printer, CD-ROM, CD-R, CD-RW, DVD-ROM, DVD-R, DVD-RW, USB drive, modem and network card.

The computer system 1 further includes a printed circuit board (PCB, not shown) referred to as a mother board. The memory controller 30 and/or the I/O controller 50 may be mounted on the PCB. The PCB may include at least one of a plurality of slots (not shown) in which the CPU 10, the memory 20, the memory controller 30 and the device 60 can be installed respectively.

The memory controller 30 sends and receives a signal to and from the memory 20 to interface data reading from and writing to the memory 20. The memory controller 30 may transmit a signal including an address, data and a command to the memory 20. The memory controller 30 receives a memory output signal outputted from the memory 20 and estimates data values contained in the memory output signal based on the level of the memory output signal.

Figure 2:
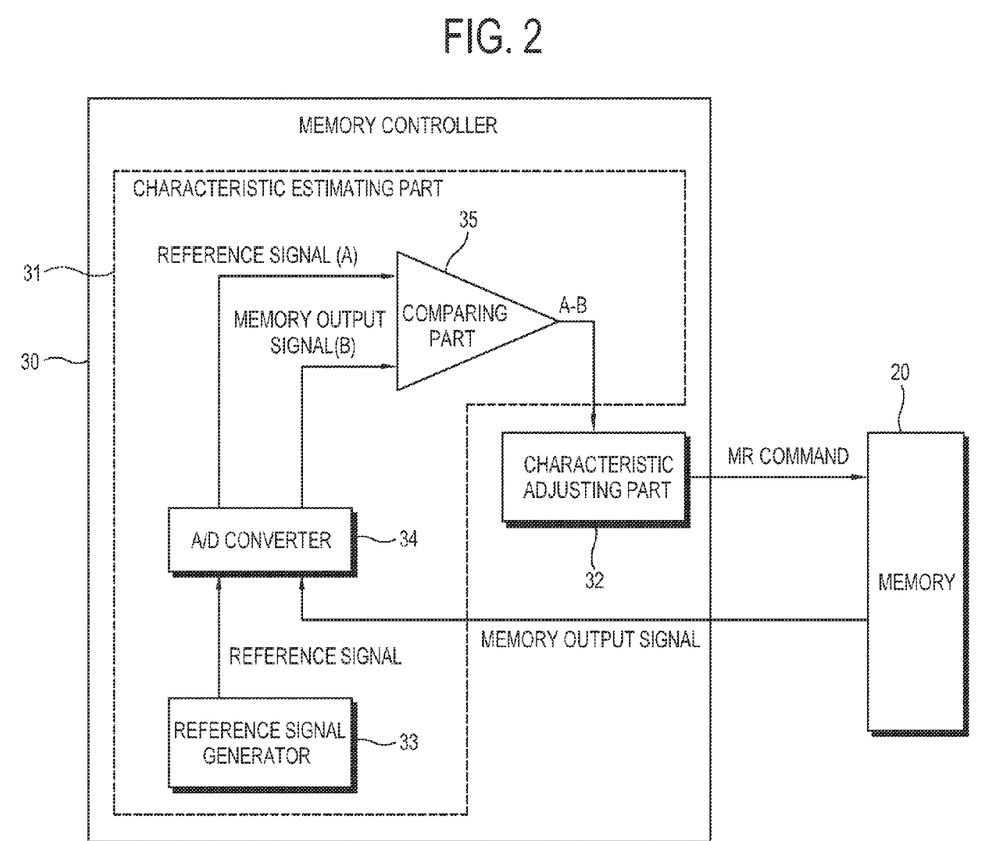
FIG. 2 illustrates a memory controller according to an embodiment of the present invention.

FIG. 2 illustrates a configuration of the memory controller 30 according to an embodiment of the present invention. In FIG. 2, a part of the configuration of the memory controller 30 is omitted for the sake of clarity. The omitted part includes elements for performing signal communication with the memory 20 to interface data reading from and writing to the memory 20.

As shown in FIG. 2, the memory controller 30 includes a characteristic estimating part 31 for estimating a characteristic of the memory output signal outputted from the memory 20, and a characteristic adjusting part 32 for controlling the memory 20 so that the characteristic of the memory output signal is within a predetermined reference range.

Figure 3:
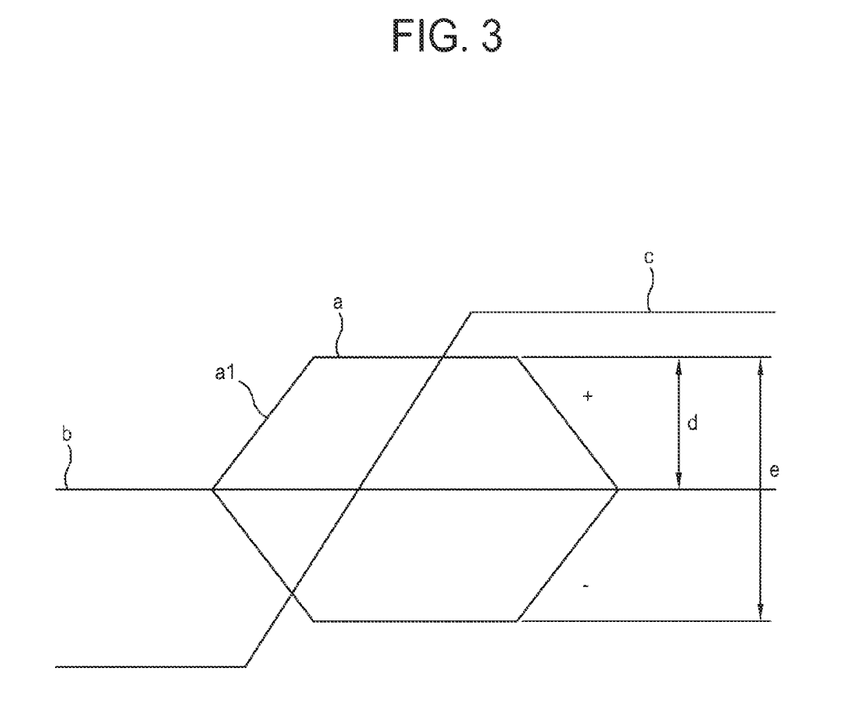
FIG. 3 illustrates a memory output signal according to an embodiment of the present invention.

The memory output signal to be estimated by the characteristic estimating part 31 includes a data strobe. The characteristic of the memory output signal to be estimated includes, for example, the level and slew rate of the memory output signal, and it is noted that other characteristics may be estimated. FIG. 3 illustrates the level and slew rate of the memory output signal according to an embodiment of the present invention. In FIG. 3, a reference character 'a' refers to a memory output signal, a reference character 'b' refers to a reference level, and a reference character 'c' refers to a clock signal. The level of the memory output signal 'a' may be represented by a reference character 'd' or 'e'. The slew rate is an increase or decrease rate of the memory output signal 'a' per unit time, as represented by 'a1'.

The memory controller 30 estimates the memory output signal 'a' to be high or low on the basis of the reference level 'b' and the clock signal 'c'. If the level 'd' or 'e' of the memory output signal 'a' is too small, a margin for estimating the memory output signal 'a' becomes narrow.

As shown in FIG. 2, the characteristic estimating part 31 may include a reference signal generating part 33 for generating a reference signal corresponding to the predetermined reference range, and a comparing part 35 for comparing the memory output signal outputted from the memory 20 with the reference signal generated by the reference generating part 33. If the reference signal and the memory output signal are analog signals, the characteristic estimating part 31 may include an A/D converter 34 for converting the reference signal and the memory output signal into digital signals.

The reference signal generated by the reference signal generating part 33 is an ideal memory output signal having characteristics expected to be outputted from the memory 20. The level and slew rate of the reference signal may be predetermined in consideration of characteristics of the computer system 1 including the memory controller 30.

The comparing part 35 compares voltages (A and B) of the memory output signal and the reference signal, and outputs a voltage difference (A−B). According to an embodiment of the present invention, the comparing part 35 compares the voltages of the memory output signal and the reference signal, but alternatively, may compare slew rates of the memory output signal and the reference signal.

If the voltage difference (A−B) is the same as or above a predetermined reference value, the characteristic adjusting part 32 controls the memory 20 so that the voltage difference (A−B) is decreased. According to aspects of the present invention, the predetermined reference value may be zero. That is, the characteristic adjusting part 32 may control the memory 20 so that the level of the memory output signal can be identical to the level of the reference signal.

In order to control the memory 20, the characteristic adjusting part 32 sets a mode register (not shown) of the memory 20 for storing data for controlling an operation mode of the memory 20. Burst type, burst length, CAS (column address strobe) latency, DLL (dynamic link library) enable/disable, single-ended strobe, etc., of the memory 20 may be controlled by setting the mode register.

Figure 4:
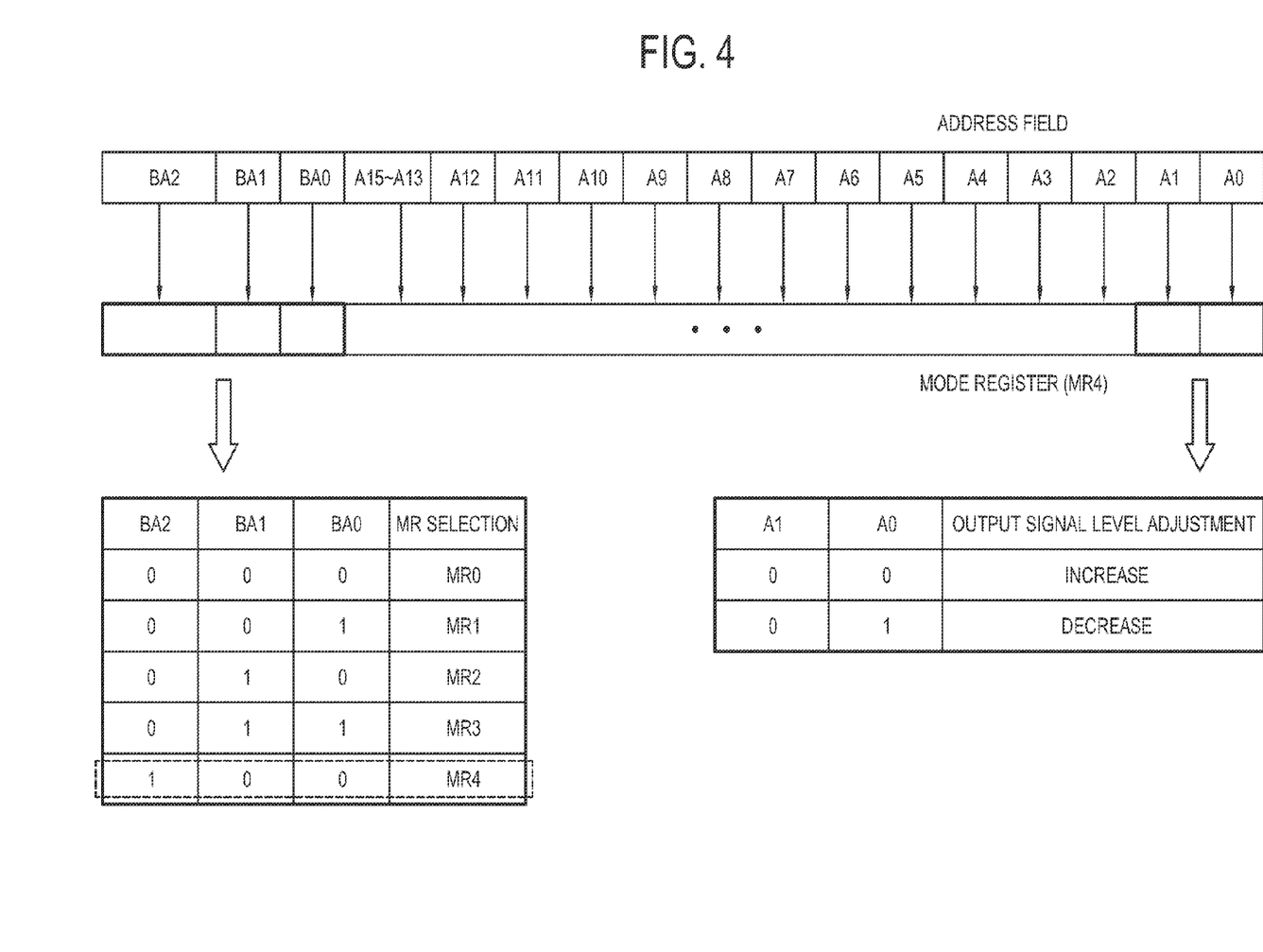
FIG. 4 illustrates a setting of a mode register according to an embodiment of the present invention.

FIG. 4 illustrates a setting of the mode register according to an embodiment of the present invention. As shown in FIG. 4, the setting of the mode register may be performed by setting values of address fields A0 to A15 and BA0 to BA2. To this end, the characteristic adjusting part 32 may issue an MR command (see FIG. 2) such as 'MRS' (mode register set) to the memory 20.

According to an embodiment of the present invention, a mode register 4 (MR4) is selected by setting the address fields BA0, BA1 and BA2 to 0, 0 and 1, respectively, and the address fields A0 and A1 are accordingly set, allowing the level of the memory output signal outputted from the memory 20 to be adjusted. If the address fields A0 and A1 are set to 0 and 0, respectively, the memory 20 increases the level of the memory output signal by a predetermined value according to the setting of the mode register 4 (MR4) and outputs the memory output signal of which the level has been increased. Alternatively, if the address fields A0 and A1 are set to 1 and 0, respectively, the memory 20 decreases the level of the memory output signal by a predetermined value and outputs the memory output signal with the level increased.

The memory controller 30 re-estimates the memory output signal adjusted and outputted by the memory 20 by using the mode register set, and continuously performs adjustment so that the memory output signal aligns with the reference signal.

As a result of the adjustment of the memory controller 30, the memory output signal outputted from the memory 20 is close to the ideal memory output signal as expected by the memory controller 30.

Hence, although the level or other characteristics of the memory output signal outputted from the memory 20 does not reach the expected ideal level, the level of the memory output signal can reach the ideal level by the adjustment of the memory controller 30 to secure a sufficient margin of the memory output signal, thereby improving reliability in operation of the computer system 1.

Figure 5:
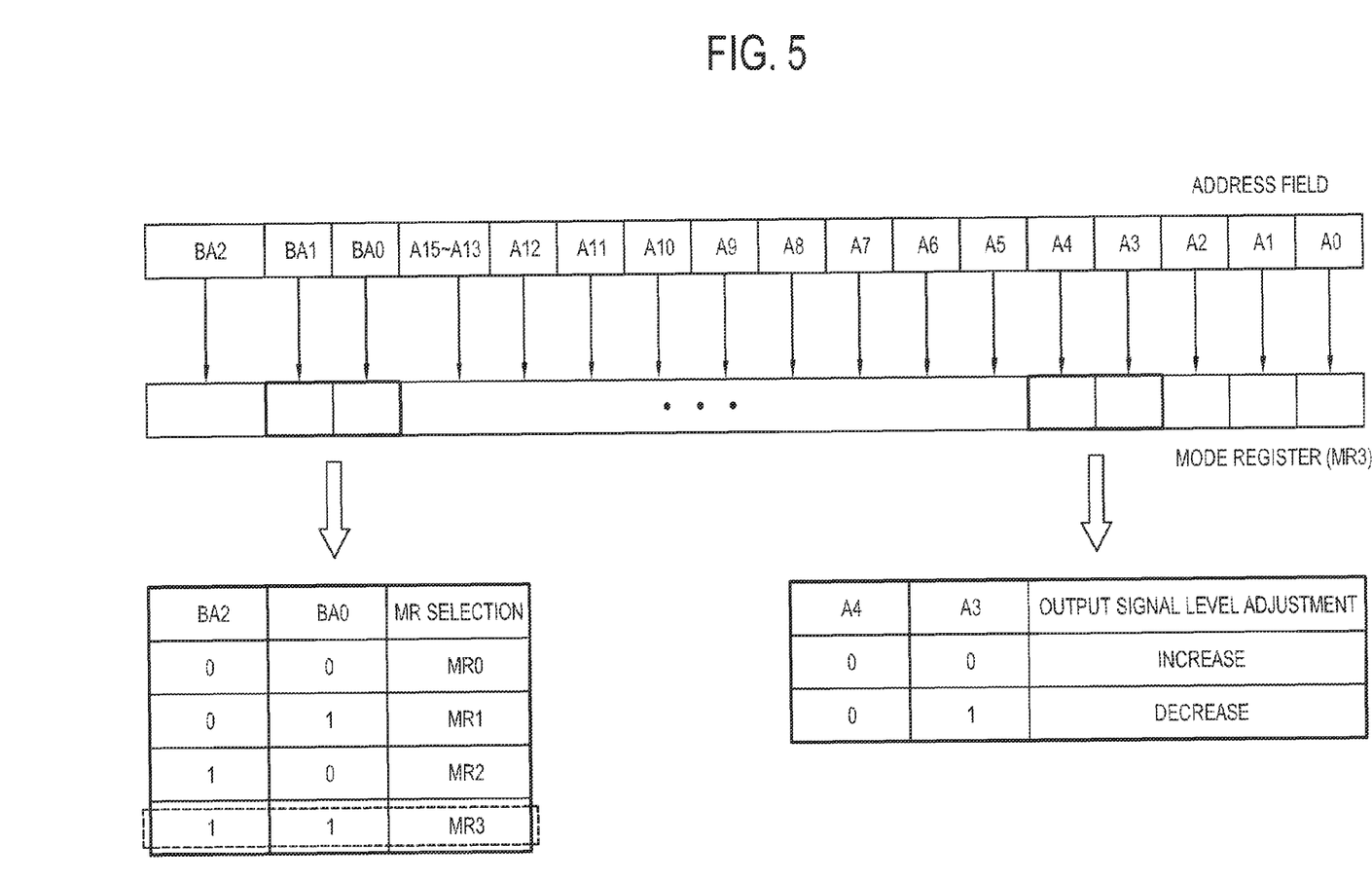
FIG. 5 illustrates a setting of a mode register according to another embodiment of the present invention.

FIG. 5 illustrates a setting of a mode register according to another embodiment of the present invention. As shown in FIG. 5, in a manner similar to the case of FIG. 4, a mode register MR3 is selected by setting the address fields BA0 and BA2 to 1 and 1, respectively, and the address fields A3 and A4 are accordingly set, so that the level of the memory output signal can be adjusted.

According to the above embodiments, the level of the memory output signal is exemplified as a characteristic of the memory output signal, but any other characteristic such as slew rate may be applied to the preset invention.

Figure 6:
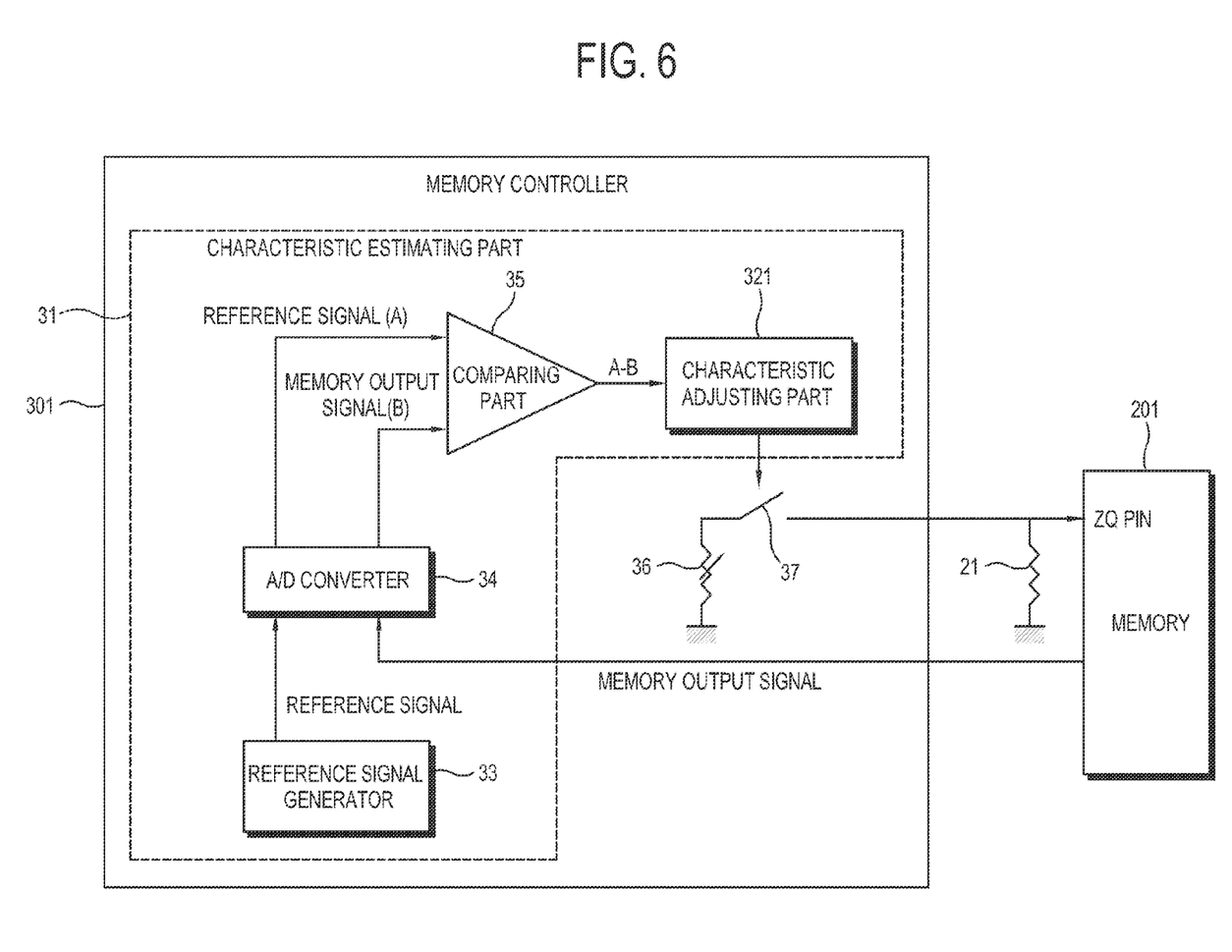
FIG. 6 illustrates a memory controller according to another embodiment of the present invention.

FIG. 6 illustrates a configuration of a memory controller 301 according to another embodiment of the present invention. In this regard, components of the memory controller 301 like or similar to those of the above-described memory controller 30 may not be described for the sake of clarity.

A memory 201 which is, for example, a DDR3 type is provided with a ZQ pin to which a ZQ resistor 21 is connected, and can perform ZQ calibration for calibrating impedance of the memory 201 using the ZQ resistor 21.

The memory controller 301 may further include a variable adjusting resistor 36 to be connected to the ZQ resistor 21, and a switch 37 selectively connecting the variable adjusting resistor 36 in parallel to the ZQ resistor 21.

A characteristic adjusting part 321, for example, may short-circuit the switch 37 to connect the variable adjusting resistor 36 in parallel to the ZQ resistor 21, if a voltage difference (A−B) of a memory output signal and a reference signal, which is outputted by a comparing part 35, is equal to or more than a predetermined value. In such a case, since resistance of the memory 201 at the ZQ pin decreases due to the parallel connection of the variable adjusting resistor 36 and the ZQ resistor 21, the memory 201 adjusts impedance to decrease the level of the memory output signal by a predetermined value.

The resistance of the ZQ resistor 21 may be about 240Ω; and resistance of the variable adjusting resistor 36 may be predetermined to correspond to the level of an ideal memory output signal expected by the memory controller 301. Further, the variable adjusting resistor 36 may be a variable resistor having variable resistance.

Figure 7:
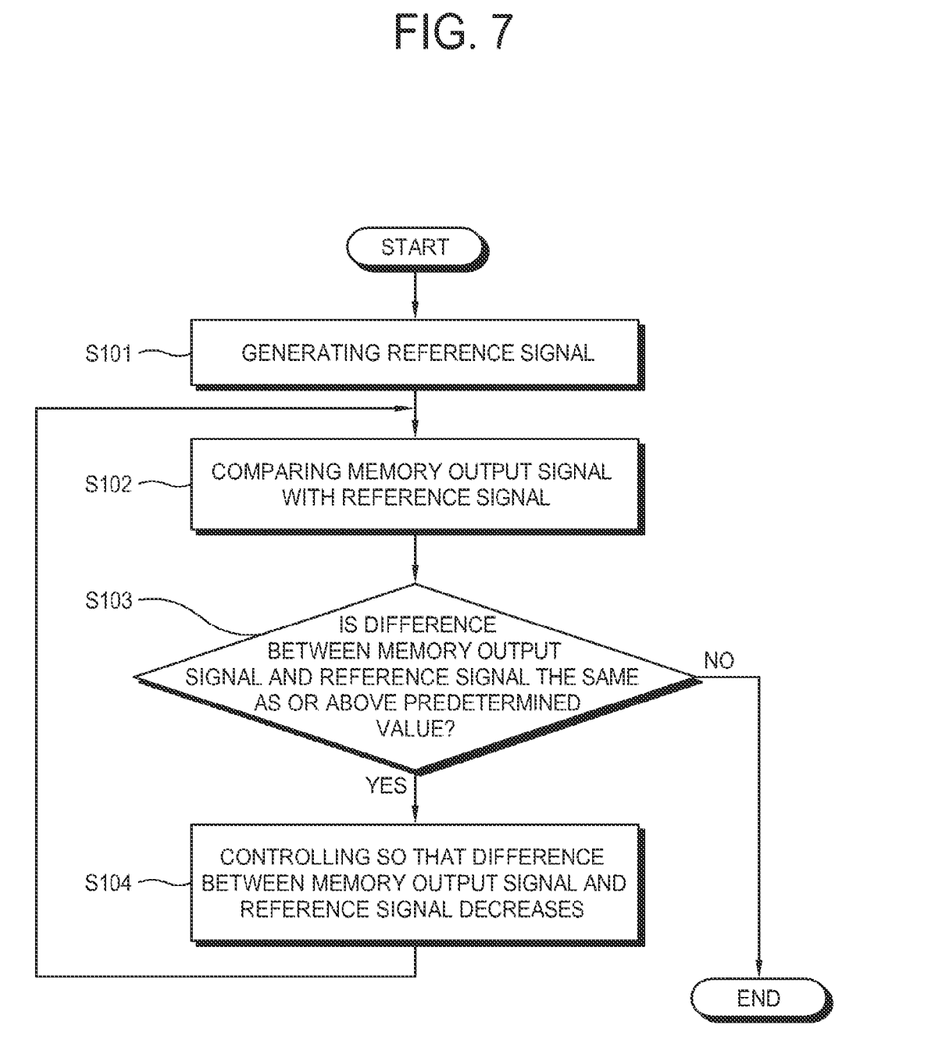
FIG. 7 illustrates a memory adjusting method according to an embodiment of the present invention.

FIG. 7 illustrates a memory adjusting method according to an embodiment of the present invention. The memory adjusting method may be performed by the above-described memory controller 30 or 301. For the convenience of clarity, repetitive description with respect to the memory controller 30 or 301 may be omitted.

First, a reference signal is generated which has characteristics of an ideal memory output signal as expected to be outputted from the memory 20 or 201 (S 101).

Then, a memory output signal from the memory 20 or 201 is compared with the reference signal (S102). For example, voltages of the memory output signal and the reference signal may be compared. Then, it is determined whether a difference between the voltage of the memory output signal and the voltage of the reference signal is the same as or above a predetermined value (S103).

If it is determined at operation S103 that the voltage difference is the same as or above the predetermined value, the memory 20 or 201 is controlled to decrease the voltage difference (S104). Then, the process returns to operation S102, and repeats operations S102 to S104.

If it is determined at operation S103 that the voltage difference is below the predetermined value, the process is terminated.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A memory controller for interfacing data reading from and writing to a memory, comprising:
   a characteristic estimating part estimating a characteristic of a memory output signal outputted from the memory for the data reading and writing and re-estimating the memory output signal adjusted and outputted from the memory by using a mode register set so that the memory output signal aligns with a reference signal; and
   a characteristic adjusting part controlling the memory so that the characteristic of the memory output signal is within a predetermined reference range if the characteristic of the memory output signal estimated by the characteristic estimating part is beyond the predetermined reference range.

2. The memory controller according to claim 1, wherein the characteristic estimating part comprises:
   a reference signal generating part generating the reference signal corresponding to the predetermined reference range; and
   a comparing part comparing the memory output signal outputted from the memory with the reference signal.

3. The memory controller according to claim 1, wherein the characteristic adjusting part sets the mode register of the memory storing data for controlling an operation mode of the memory.

4. The memory controller according to claim 1, further comprising a calibration resistor connected to the memory to calibrate impedance of the memory.

5. The memory controller according to claim 4, further comprising a variable adjusting resistor, wherein the characteristic adjusting part varies resistance of the variable adjusting resistor to adjust the impedance of the memory.

6. The memory controller according to claim 5, wherein the variable adjusting resistor is selectively connected in parallel to the calibration resistor.

7. The memory controller according to claim 1, wherein the memory output signal estimated by the characteristic estimating part comprises a data strobe.

8. The memory controller according to claim 1, wherein the characteristic of the memory output signal comprises at least one of level and slew rate of the memory output signal.

* * * * *